//USOO5319466A

United States Patent [19]
Gedl

[11] Patent Number: 5,319,466
[45] Date of Patent: Jun. 7, 1994

[54] SYSTEM FOR RECORDING AND REPRODUCING PICTURE SIGNALS INTO WHICH CHARACTER SIGNALS CAN BE INSERTED

[75] Inventor: Karl Gedl, St. Pölten-Spratzern, Austria

[73] Assignee: U.S. Philips Corporation, New York, N.Y.

[21] Appl. No.: 6,547

[22] Filed: Jan. 21, 1993

[30] Foreign Application Priority Data

Feb. 25, 1992 [AT] Austria .................................. 355/92

[51] Int. Cl.[5] .......................... H04N 5/76; H04N 9/79
[52] U.S. Cl. ..................................... 358/310; 358/320; 358/335; 358/312; 360/33.1
[58] Field of Search ............... 358/335, 312, 315, 320, 358/310; 360/33.1, 35.1; H04N 5/76, 5/783

[56] References Cited

U.S. PATENT DOCUMENTS 5,051,846 9/1991 Tsushima et al. .................... 358/341
5,132,807 7/1992 Takimoto et al. .................... 358/341

Primary Examiner—Tommy P. Chin
Assistant Examiner—Huy Nguyen
Attorney, Agent, or Firm—Edward W. Goodman

[57] ABSTRACT

In a video recorder (1) for the recording and reproduction of picture signals in standard-play modes and long-play modes a reconverted picture color signal supplied by a frequency-conversion stage (70) is passed through a delay device (84) having a delay of one line period in order to compensate for reproduction-dependent time errors during multi-speed reproduction of a long-play recording. In such a video recorder (1) a rectangular detection signal of half the line frequency is supplied to an output (76) of a phase detection stage (73) which detects the phase of the burst signal in the reconverted picture color signal, which detection signal is applied, via a connection (91), to a modulator (36) for the modulation of non-modulated character signals as a control signal (S2) for the modulator (36), which generates modulated character signals suitable for insertion into the reproduced picture signals. The connection (91) includes a switching device (93) which enables a further delay device (94) having a delay of one line period to be included in the connection (91) in the case of multi-speed reproduction of a long-play recording by the video recorder (1), as a result of which the control signal (S2) is delayed by the same time as the picture color signal during such a reproduction mode, which ensures that the picture color signal and the character color signal always remain locked to each other in the same way in all the modes of operation.

4 Claims, 1 Drawing Sheet

SYSTEM FOR RECORDING AND REPRODUCING PICTURE SIGNALS INTO WHICH CHARACTER SIGNALS CAN BE INSERTED

BACKGROUND OF THE INVENTION

1. Field of the Invention

The invention relates to a system for recording and reproducing picture signals comprising a phase-modulated or frequency-modulated picture color signal on and from a magnetic tape in adjacent tracks which are inclined relative to the longitudinal direction of the tape, the picture signals being recorded and reproduced in a first recording mode and in a first reproduction mode with a first tape speed, and in a second recording mode and in a second reproduction mode with a second tape speed which is preferably a sub-multiple of the first tape speed, the video signals recorded in the first recording mode being additionally reproducible in at least one first further reproduction mode with at least one first further tape speed which differs from the first tape speed, and the video signals recorded in the second recording mode being additionally reproducible in at least one second further reproduction mode with at least one second further tape speed which differs from the second tape speed, modulated character signals, which comprise a phase-modulated or a frequency-modulated character color signal, being insertable into at least the reproduced picture signals, the system having a conversion stage for reconverting a reproduced picture color signal to an original frequency range, the conversion stage supplying the reconverted picture color signal to an output, having a detection stage which is arranged behind the output of the conversion stage and which, in the case of a phase-modulated picture color signal, is constructed as a phase detection stage for detecting the phase of the burst signal in the reconverted picture color signal and, in the case of a frequency-modulated picture color signal, is constructed as a frequency detection stage for detecting the frequency of the non-modulated color subcarrier signals in the reconverted picture color signal, the detection stage supplying a detection signal of half the line frequency to an output, having a first switching device arranged behind the output of the conversion stage and controllable by means of a control device, the first switching device being set to a first switch position by the control device in the second further reproduction mode of the system, in which first switch position, a first delay device of the system with a delay time of one line period is arranged in series with the first switching device and the reconverted picture color signal supplied to the output of the conversion stage is transferred with a delay of one line period to a further signal-processing stage of the system, the first switching device being set to a second switch position by the control device in all the other reproduction modes of the system, in which second switch position, the first delay device is bypassed and the reconverted picture color signal supplied to the output of the conversion stage is transferred without a delay to the further signal-processing stage, and having a character generator for the generation of non-modulated character signals and a modulator which is connected to the character generator and which enables the non-modulated character signals to be converted into modulated character signals to be inserted, and having a character insertion stage which is connected to the further signal processing stage and to the modulator and which is adapted to insert the modulated character signals at least into the reproduced picture signals, the modulator comprising a control input to the a control signal of half the line frequency is applied, which control signal being phase-locked to a detection signal of half the line frequency supplied to the output of the detection stage, in order to achieve that the reproduced picture color signals and the character color signals to be inserted are locked in phase in the case of a phase-modulated picture color signal, and are locked in frequency in the case of a frequency-modulated picture color signal.

2. Description of the Related Art

A system of the type defined in the opening paragraph is known from the prior art. In such a system, character signals corresponding to colored characters, such as colored letters or colored graphic symbols, can be inserted into picture signals corresponding to color pictures. This should be effected in such a way that the colored characters corresponding to the character signals are always reproduced on the display screen of a television receiver with the same color, i.e. in such way that, for example, red characters always and in all modes appear as red characters on the display screen on which the picture signals are displayed as a colored background picture.

When picture signals and character signals are reproduced on the display screen of a television receiver, the reference for the demodulation of both the background-picture color signal and the character color signal are formed by burst signal of the background-picture color signal in the case of phase-modulated color signals, as is the case with the PAL system, and by the unmodulated color subcarrier of the background-picture color signal in the case of frequency-modulated color signals, as is the case with the SECAM system. Therefore, a color signal component of a character color signal and a color signal component of a background-picture color signal should be in the same phase relationship to the burst signal of the background-picture color signal in the case of phase-modulated color signals, and they should be in the same frequency relationship to the unmodulated color subcarrier signals of the background-picture color signal in the case of frequency-modulated color signals in order to ensure that both color signal components are reproduced in the same color on the display screen. In the case of phase-modulated color signals, an inserted character color signal should therefore be locked in phase, and in the case of frequency-modulated color signals, it should be locked in frequency to the background-picture color signal in order to guarantee that the character color signal is always reproduced on the display screen with a specified color.

In order achieve this in the prior-art system for processing picture signals with a phase-modulated picture color signal, a rectangular detection signal of half the line frequency, appearing on the output of the detection stage formed by a phase detection stage, is applied to a generator stage for the generation of a rectangular control signal of half the line frequency, the detection signal controlling this generator stage so as to provide phase-locking of the generated control signal to the detection signal. The rectangular control signal of half the line frequency thus generated is applied to the control input of the modulator. Each positive edge of this rectangular control signal corresponds to a positive phase ($+45°$) of the burst signal of the background-picture color signal and a positive phase of the (R−Y) component of the background-picture color signal, and each negative edge corresponds to a negative phase (−45°) of the burst signal of the background-picture color signal and a negative phase of the (R−Y) component of the background-picture color signal. In the modulator, the positive phase of the (R−Y) component of the character color signal is assigned to each positive edge of the rectangular control signal and the negative phase of the (R−Y) component of the character color signal is assigned to each negative edge of the rectangular control signal. In this way, it can be achieved that the phase of the (R−Y) component of the character color signal is rigidly locked to the rectangular control signal and thus to the burst signal and to the phase of the (R−Y) component of the background-picture color signal, which corresponds to the rigid phase lock between the character color signal and the background-picture color signal explained above.

In the prior-art system, the rectangular control signal is applied to the modulator independently of the reproduction mode to which the system has been set. However, if the system is set to a second further reproduction mode, in which reproduction is effected with a tape speed which differs from the low second tape speed, i.e. in the case of so-called multi-speed reproduction of a long-play recording, this results in color reproduction problems in the reproduction of inserted colored characters because in such a reproduction mode, in order to compensate for reproduction-dependent time shifts in the background-picture color signal, this color signal must be applied via a delay device having a delay of one line period, which device may be constituted by a delay line or a stage for the formation of a conjugate signal, as a result of which the rigid phase lock between the burst signal and the (R−Y) component in the background-picture color signal, on the one hand, and the rectangular control signal and consequently the (R−Y) component of the character color signal, on the other hand, will be lost. When colored character signals are inserted into picture signals to be reproduced in a so-called multi-speed reproduction mode of a long-play recording, this will result in the characters being reproduced on the display screen of a television receiver with an undesired wrong color.

SUMMARY OF THE INVENTION

It is the object of the invention to solve the above problem in a simple manner and to guarantee that the background-picture color signal and the character color signal remain locked to each other in the same way in all the reproduction modes, thereby ensuring a stable color reproduction of inserted colored characters. To this end, the invention is characterized in that the control input of the modulator is preceded by a second switching device which is controlled by the control device in the same way as the first switching device and which is set to a first switch position by the control device in the second further reproduction mode of the system. In this first switch position, a second delay device of the system, with a delay time of one line period, is arranged in series with the second switching device and the control signal applied to the control input of the modulator is transferred with a delay of one line period to the control input of the modulator. This second switching device is set to a second switch position by the control device in all the other reproduction modes of the system. In this second switch position, the second delay device is bypassed and the control signal applied to the control input of the modulator is transferred without a delay to the control input of the modulator. In this way, it is achieved by simple means that the background-picture color signal and the character color signal remain locked to one another in the same way in all the reproduction modes. This ensures that the color reproduction of inserted colored characters remains always the same in a system in accordance with the invention.

In such a system, the second delay device may be formed, for example, by a delay line. However, it is found to be particularly advantageous if the detection stage is adapted to supply a rectangular detection signal of half the line frequency which also forms the control signal applied to the control input of the modulator, and the second delay device, which is arranged in series with the second switching device in the first switch position of said second switching device, is constituted by an inverter circuit for inverting the rectangular control signal of half the line frequency. This embodiment is particularly simple and inexpensive.

In such a system, it is also found to be particularly advantageous if the detection stage is constructed as a phase detection stage for detecting the phase of the burst signal in the reconverted picture color signal in relation to the phase of a reference signal applied to an input of the phase detection stage, a phase switching stage is arranged before the input to which the reference signal is applied by means of which phase switching stage, the phase of the reference signal can be switched between two given phase angles, a control connection is arranged between the control device and the phase switching stage, and during the insertion of character signals into the reproduced picture signals the first switching device and the second switching device can be controlled and, in addition via the control connection, the phase switching stage can be disabled by the control device. Thus, the phase switching stage, which in principle has been provided to minimize the rectangular control signal of half the line frequency, which control signal may give rise to annoying changes in hue in the reproduced background-picture color signal, can be disabled when a character signal is to be inserted, in order to ensure that in this case a suitable rectangular control signal of half the line frequency is obtained which controls the modulator in a highly reliable manner or, if desired, can be processed in a highly reliable manner in the modulator for control purposes.

BRIEF DESCRIPTION OF THE DRAWING

An embodiment of the invention will now be described in more detail, by way of non-limitative example, with reference to the drawing.

DESCRIPTION OF THE PREFERRED EMBODIMENT

Figure 1:
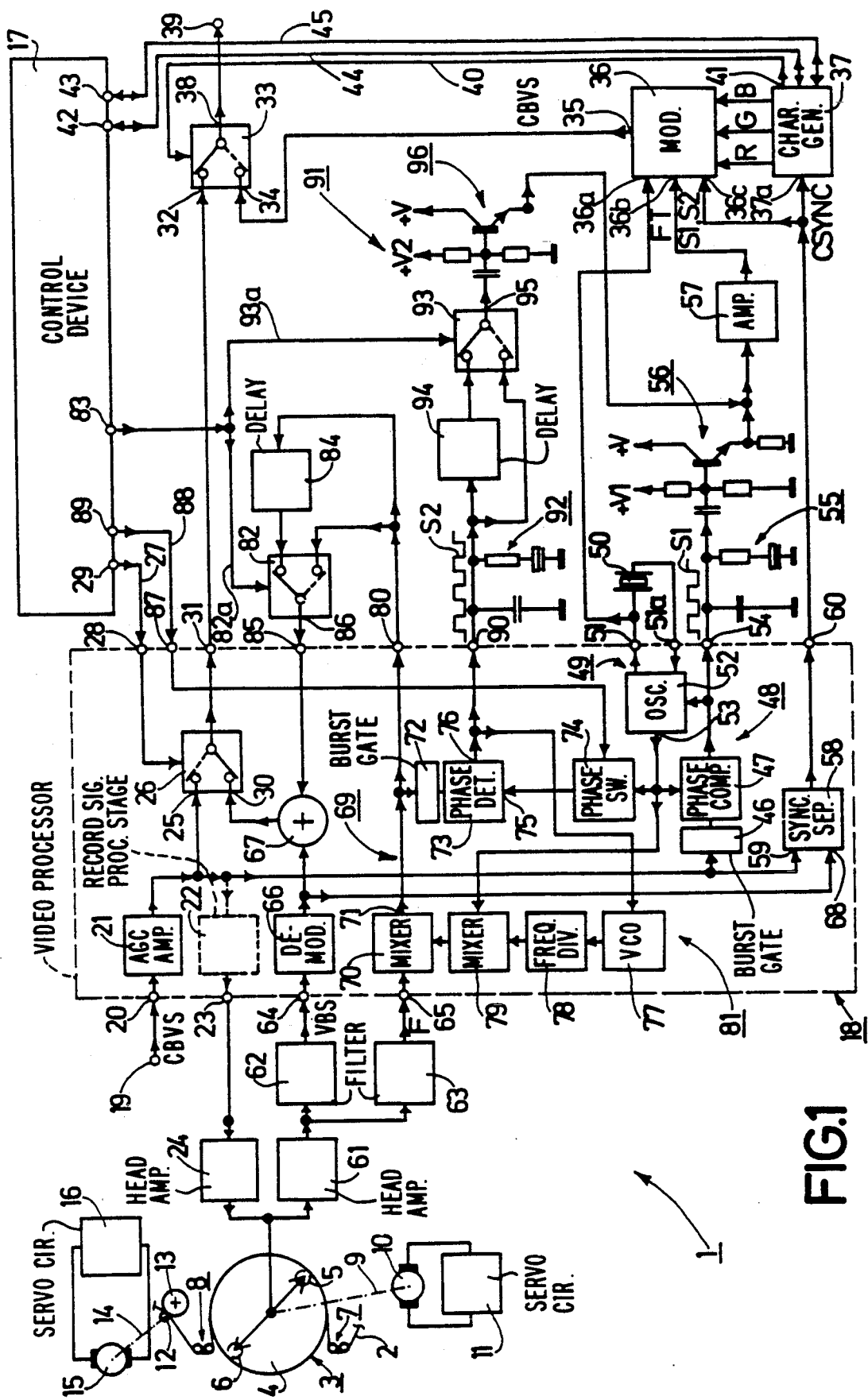
FIG. 1 shows diagrammatically the circuit diagram of a relevant part of a circuit arrangement of a video recorder utilizing the steps in accordance with the invention.

A part of a circuit arrangement of a video recorder 1 for recording and reproducing picture signals in accordance with the PAL system will now be described with reference to the circuit diagram shown in FIG. 1. As is known, picture signals in accordance with the PAL system comprise a phase-modulated picture color signal. In the video recorder 1, these picture signals can be recorded in known manner on a magnetic tape 2 in adjacent tracks which are inclined relative to the longitudinal direction of the tape, and which can subsequently be reproduced from these tracks.

For the recording and reproduction of picture signals, the video recorder 1 comprises a drum-shaped scanning device 3 having a rotatable drum section 4 carrying two magnetic heads 5 and 6. The magnetic heads 5 and 6 scan the inclined tracks on the magnetic tape 2, which is wrapped around a part of the circumferential surface of the drum-shaped scanning device 3 by means of tape-guide-pin units 7 and 8. For driving the rotatable drum section 4, there is provided a motor 10, which is connected to this drum section by means of a drive transmission 9, shown diagrammatically, and which is powered and speed-controlled by a servo circuit 11. For driving the magnetic tape 2 in its longitudinal direction, there is provided a rotatably drivable capstan 12 against which the magnetic tape 2 is pressed by means of a pressure roller 13 in order to record and reproduce picture signals. For driving the capstan 12, there is provided a motor 15, which is connected to this capstan by means of a drive transmission 14, shown diagrammatically, and which is powered by means of a further servo circuit 16, which controls the speed of this motor so as to maintain it at a desired value in accordance with the selected mode of operation.

The video recorder 1 can be set to several different recording modes and reproduction modes. The desired mode of operation selected by a user can be started by means of a control device 17 of the video recorder 1, the main part of this device being a microprocessor or microcomputer. Since the construction of the control device 17 is not relevant here, the device is not shown in detail in FIG. 1 for the sake of simplicity.

The video recorder 1 can be set to a first recording mode and a first reproduction mode, in which the capstan 12 drives the magnetic tape 2 with a first tape speed, the so-called normal tape speed. These two modes provide so-called standard-play recording and standard-play reproduction. Moreover, the video recorder 1 can be set to a second recording mode and a second reproduction mode, in which the capstan 12 drives the magnetic tape 2 with a second tape speed which is an integral number of times, i.e. two times, slower than the normal tape speed. These two modes provide so-called long-play recording and long-play reproduction. In addition, the video recorder 1 can be set to at least one further reproduction mode, in which the picture signals recorded in the first recording mode can be reproduced with at least a first further tape speed deviating from the normal tape speed and realized by means of the capstan 12. Such a reproduction mode is usually referred to as multi-speed reproduction of a standard-play recording. The video recorder 1 can further be set to at least a second further reproduction mode, in which picture signals recorded in the second recording mode can be reproduced with at least a second further tape speed deviating from the second tape speed and realized by means of the capstan 12. Such a reproduction mode is usually referred to as multi-speed reproduction of a long-play recording.

The circuit arrangement of the video recorder 1 shown in FIG. 1 comprises a so-called one-chip video processor IC 18, which may be the IC type number LA 7391, which is commercially available from Sanyo. FIG. 1 diagrammatically represents the IC 18 by means of a broken line and shows only the relevant parts of the IC 18.

A picture signal to be recorded, also referred to as the picture CVBS signal, which may be supplied by, for example, a tuner of the video recorder 1, is applied to an input 19, of the present circuit arrangement. From this input 19 the picture CVBS signal is applied to an input 20 of the IC 18. The picture CVBS signal is transferred from the input 20 to a control amplifier stage 21, generally referred to as an AGC amplifier. A picture signal to be recorded is applied from the AGC amplifier 21 to a recording signal-processing stage 22, which is shown only diagrammatically in FIG. 1 and which, in known manner, separates the luminance signal and the color from one another by means of separate filter stages, after which the luminance signal is subjected to a frequency modulation and the color signal is converted to a lower frequency and subsequently, the resulting signals are recombined to one output signal appearing on an output 23 of the IC 18. From the output 23 of the IC 18, this output signal is applied to a recording head-amplifier 24, whose output signal is applied to the two magnetic heads 5 and 6 in order to be recorded on the magnetic tape 2.

The picture signal supplied by the AGC amplifier 21 is also applied to a first input 25 of a recording/play switch 26, hereinafter briefly referred to as RP switch. The RP switch 26 is controlled by the control device 17 via a control path 27, this path extending via a terminal 28 of the IC 18 and via an output 29 of the control device 17. The control device 17 switches the RP switch 26 between a first switch position, to which it is set when picture signals are recorded and in which its first input 25 is connected to its output, and a second position, to which it is set in each reproduction mode and in which its second input 30 is connected to its output. The output of the RP switch 26 is connected to an output 31 of the IC 18, this output 31 thus also constituting the output of the RP switch.

The output 31 of the IC 18 is connected to a first input 32 of a character-insertion stage 33 which is constructed as a switching device and which has its second input 34 connected to a signal output 35 of a modulator 36 connected to a character generator 37. The character generator 37 serves for generating non-modulated character signals corresponding, for example, to colored letters or colored graphic symbols. The non-modulated character signals which can be generated by the character generator 37 are applied in so-called RGB form to the modulator 36, by means of which the non-modulated character signals can be converted into suitably modulated character signals to be inserted. On its signal output 35 the modulator 36 produces a character signal, also referred to as character CVBS signal, which comprises a character luminance signal and a character color signal and which is applied to the second input 34 of the input stage 33. As already stated, the picture signal, i.e. the picture CVBS signal, is applied from the output 31 of the IC 18 to the first input 32 of the insertion stage 33. This is effected in a recording mode for the purpose of looping the picture signal through the video recorder to a television receiver connected to the recorder. In the case that inserted character signals should be recorded on the magnetic tape 2 together with picture signals a further character-insertion stage may be provided before the input 19 of the circuit arrangement in the present video recorder 1, which stage receives the character signals to be inserted from the modulator 36 and which, for the sake of simplicity, is not shown because it is not relevant here. Depending on the setting of the insertion stage 33, either the picture CVBS signal or the character CVBS signal is transferred to an output 38 of the insertion stage 33, from which the relevant signal is supplied to an output 39 of the circuit arrangement of the video recorder 1 shown in FIG. 1. From the output 39, the relevant CVBS signal is applied to further signal processing stages and from these stages to a television receiver in which the CVBS signal is demodulated and reproduced on the display screen.

The character insertion stage 33 is controlled by the character generator 37 via a control connection 40 connected to an output 41 of the character generator 37 in order to control the change-over between the two settings of the insertion stage 33 and thus achieve the desired insertion of character signals into the picture signals which are looped-through in the case of recording, so that these character signals are also recorded in the video recorder 1. Connections 44 and 45 between the character generator 37 and two terminals 42 and 43 of the control device 17 serve for the exchange of control and data information. In the present example, only two connections 44 and 45 are shown but in practice more than two of these connections may be provided. Via these connections 44 and 45, the control device 17 informs the character generator 37 which character signals must be generated.

As explained above, a picture signal to be recorded is applied from the AGC amplifier 21 to a recording signal-processing stage 22. Of this recording signal-processing stage 22, represented diagrammatically in FIG. 1, only a part which is relevant is shown in detail. The CVBS signal supplied by the AGC amplifier 21 is applied to a burst gate 46, which may be considered to belong to the recording signal-processing stage 22, in which burst gate the burst signal is extracted from the CVBS signal to be recorded. The extracted burst signal is applied to a phase comparator 47 connected to the burst gate 46. The phase comparator 47 forms part of a phase-locked loop 48 by means of which in a recording mode, a 4.43 MHz signal from a quartz oscillator 49, whose quartz crystal 50 is connected to the actual oscillator stage 52 via two terminals 51 and 51a of the IC 18, is locked in phase to the burst signal of the picture color signal to be recorded. In a recording mode, the quartz oscillator 49 is then operated as a voltage-controlled quartz oscillator controlled by the output signal of the phase comparator 47. A 4.43 MHz signal generated by the oscillator circuit 52 in the phase-locked loop 48, which signal is locked in phase to the burst signal of the picture color signal to be recorded and which forms the so-called color subcarrier FT, is applied from the terminal 51 of the IC 18 to an input 36a of the modulator 36. Likewise, this 4.43 MHz signal is applied to the phase comparator 47 via another output 53 of the oscillator circuit 52 for phase comparison with the burst signal of the picture signal to be recorded. In the modulator 36, the color subcarrier FT is used for modulating the non-modulated character signals received from the character generator 37. Thus, in the modulator 36, the character color signals are modulated with a color subcarrier which is locked to the burst signal of the picture color signal to be recorded.

It is to be noted that the (R−Y) component in the picture color signal is inverted on alternate lines. In the modulator 36, which in the present case is obviously constructed as a PAL modulator, the (R−Y) component is also inverted from line to line. In order to ensure that a color signal component of a picture signal and a color signal component of a character signal corresponding to the same color are reproduced with the same color on the display screen of a television receiver the (R−Y) components of the picture color signal and of the character color signal should be in the same state of inversion or in phase.

In order to achieve this, the following measures have been taken in the circuit arrangement of the video recorder 1 shown in FIG. 1. As is known, the burst phase in the picture color signal in accordance with the PAL system is switched between ±45° in a line alternating fashion. On the output of the phase comparator 47, this phase alternation produces a detection signal in the form of a rectangular output signal of half the line frequency having positive and negative edges, a positive edge corresponding to the positive burst phase (+45°) and a negative edge corresponding to the negative burst phase (−45°). This output signal of the phase comparator 47 is applied not only to the oscillator stage 52 but also to an output 54 of the IC 18, where this signal is available in the form of a rectangular control signal S1 of half the line frequency. This control signal S1 is usually referred to as a ripple signal. A so-called loop filter 55 is connected to the output 54 of the IC 18. The control signal S1 is applied from the output 54 of the IC 18 to a transistor stage 56 via the loop filter 55, which stage is constructed as a switching and buffer stage and whose transistor is connected to a continuously available supply voltage +V and whose base voltage divider can be connected to a supply voltage +V1. However, the supply voltage +V1 is applied to the base voltage divider only when the video recorder 1 is in a recording mode. The rectangular control signal S1 of half the line frequency is taken from the emitter resistor of the transistor stage 56 and is applied to an amplifier stage 57, from which the control signal S1 is applied to a control input 36b of the modulator 36.

In the modulator 36, the rectangular control signal S1 of half the line frequency is used for control purposes. In the modulator 36, the positive phase of the (R−Y) component of the character color signal is allocated to a positive edge of the control signal S1, which corresponds to the positive burst phase (+45°) and the positive phase of the (R−Y) component of the picture color signal. Likewise, the modulator 36 allocates the negative phase of the (R−Y) component of the character color signal to a negative edge of the control signal S1, which corresponds to the negative burst phase (−45°) and the negative phase of the (R−Y) component of the picture color signal. In this way, it is achieved that the (R−Y) phase of the character color signal is locked to the burst signal and hence to the (R−Y) phase of the picture color signal. The looped-through picture color signal and the character color signal to be inserted are simply locked in phase by applying the rectangular control signal S1 of half the line frequency to the modulator 36 and processing this signal in this modulator, as a result of which color signal components of a picture signal and of a character signal which correspond to the same color are always reproduced in the same color on the display screen of a television receiver.

It is to be noted that for their synchronization, the character generator 37 and the modulator 36 also receive the synchronization signals separated from a picture signal to be recorded. For this purpose, the picture signal to be recorded is applied from the AGC amplifier 21 to an input 59 of a sync separator 58 by means of which the synchronization signals, also referred to as composite sync CSYNC, are extracted from this picture signal. The extracted sync signals are applied to an input 37a of the character generator 37 and to an input 36c of the modulator 36 via an output 60 of the IC 18.

During reproduction of a previously recorded picture signal, the picture signal, which has been read from the magnetic tape 2 by means of the magnetic heads 5 and 6, is applied to a reproduction head-amplifier 61. From the reproduction head-amplifier 61, the reproduced picture signal is applied to a first filter stage 62 and to a second filter stage 63. The first filter stage 62 extracts, from the reproduced picture signal applied to it, the frequency-modulated VBS component, which is applied to an input 64 of the IC 18. The second filter stage 63 extracts, from the down-converted reproduced picture signal applied to it, the color component, i.e. the down-converted picture color signal F, which is applied to a further input 65 of the IC 18.

The input 64 is connected to a demodulator stage 66 by means of which the applied frequency-modulated signal VBS signal, which contains the luminance signal, is demodulated. The demodulated output signal of the demodulator stage 66 is applied to a summing stage 67. The output signal of the summing stage 67 is applied to the second input 30 of the RP switch 26. In the appropriate position of the RP switch 26, the output signal of the summing stage 67 is transferred to the character insertion stage 33, which can then insert the character signals into the reproduced picture signal.

The output signal of the demodulator stage 66 is further applied to a further input 68 of the sync separator 58, which in this case extracts the synchronization signal CSYNC from the reproduced picture signal read from the magnetic tape 2 and subsequently supplies this synchronization signal to the input 37a of the character generator 37 and to the input 36c of the modulator 36 for the purpose of synchronization.

The picture color signal F applied to the input 65 of the IC 18 is reconverted to its original higher frequency range in a frequency conversion circuit 69. The frequency conversion circuit 69 comprises a conversion stage formed by a mixer stage 70, which stage is arranged behind the input 65 of the IC 18 and is adapted to reconvert a down-converted reproduced picture color signal F to its original frequency range. The reconverted picture color signal appears on an output 71 of the mixer stage 70. The reconverted picture color signal is connected to a burst gate 72 which is connected to the output 71 of the mixer stage 70 and which extracts the burst signal from the reconverted picture color signal. The extracted burst signal is applied to a detection stage 73 formed by a phase detection stage.

In each reproduction mode, the quartz oscillator 49, which is used as a voltage-controlled oscillator in the phase-locked loop 48 in a recording mode, is operated as a free-running quartz oscillator. The output signal whose frequency is 4.43 MHz and which appears on the output 53 is applied to an input 75 of the phase detection stage 73 via a stage 74 to be described hereinafter. The phase detection stage 73 is also constructed as a phase comparator which detects the phase of the burst signal extracted by means of the burst gate 72 in relation to the phase of the reference signal formed by the output signal of the free-running quartz oscillator 49, which output signal is applied to the input 75 of the phase comparator 73. The output signal of the phase comparator 73, which forms the detection signal appearing on the output 76, is applied to a voltage-controlled oscillator 77 which operates at a frequency corresponding to 321 times the line frequency $f_H$ and whose output signal is applied to a frequency dividing stage 78 which divides the frequency by 8. Consequently, the output signal of the dividing stage 78 has a frequency of 627 kHz, which corresponds to 40 ⅛ times the line frequency $f_H$. The signal on the output of the frequency dividing stage 78 is applied to a mixer stage 79, which in addition receives the signal appearing on the output 53 of the free-running quartz oscillator 49. The mixer stage 79 mixes the two signals applied to it and supplies an output signal having a frequency of 5.06 MHz. This signal is applied to the conversion stage formed by the mixer stage 70, which also receives the picture color signal at a frequency around 627 kHz, which has been reproduced from the magnetic tape 2. The up-converted picture color signal at a frequency around 4.43 MHz then appears on the output of the mixer stage 70. This converted picture color signal is applied from the output 71 of the mixer stage 70 to an output 80 of the IC 18. It is to be noted that the mixer stage 70 forming a conversion stage, the burst gate 72, the phase comparator 73, the stage 74, the quartz oscillator 49, the voltage-controlled oscillator 77, the frequency dividing stage 78 and the mixer stage 79 form a further phase-locked loop 81, which, during reproduction, locks the reproduced picture color signal to the output signal of the free-running quartz oscillator 49.

The frequency-converted picture color signal is transferred from the output 80 of the IC 18 to a first switching device 82 which can be controlled by the control device 17. For this purpose, the control device 17 has a further output 83 connected to the first switching device 82 via a control connection 82a. The control device 17 controls the first switching device 82 in such a manner that in the second further reproduction mode of the video recorder 1 the control device 17 sets the first switching device 82, via the control connection 82a, to a first switch position, shown in a solid line in FIG. 1, in which position a first delay device 84 of the video recorder 1, which device has a delay of one line period, is arranged in series with the first switching device 82 and the reconverted picture color signal appearing on the output 71 of the conversion stage 70 formed by the mixer stage is transferred to the summing stage 67 with a delay of one line period, which summing stage is connected to the output 86 of the first switching device 82 via a further input 85 of the IC 18. In all the other reproduction modes of the video recorder 1, the control device 17 sets the first switching device 82 to a second switch position, shown in a broken line in FIG. 1, via the control connection 82a, in which position the first delay device 84 is bypassed and the reconverted picture color signal appearing on the output 71 of the conversion stage 70 is transferred to the summing stage 67, without a delay. In the summing stage 67 the reconverted picture color signal is combined with the demodulated luminance signal from the demodulator stage 66, after which the output signal of the summing stage 67 can be applied to a television receiver via the RP switch 26 and the character insertion stage 33. The first delay device 84 is formed by a so-called 1H delay line. However, alternatively, it may be formed by a stage for deriving a conjugate signal from the input signal applied to this stage.

As already stated, a stage 74 is arranged between the free-running quartz oscillator 49 and the phase comparator 73 forming the phase detection stage in order to minimize the detection signal appearing on the output 76 of the phase comparator 73. This stage 74 is constructed as a phase switching stage by means of which the phase of the 4.43 MHz signal, appearing on the output 53 of the free-running oscillator 49, is switched between +45° and −45° in a line-alternating fashion, so that this 4.43 MHz signal exhibits the same phase alternation as the burst signal extracted from the reproduced picture color signal. Both this extracted burst signal and the 4.43 MHz signal are applied to the phase comparator 73. Since the phase switching stage 74 ensures that these two signals exhibit the same phase alternation, the phase comparator 73 in practice does not supply a rectangular detection signal of half the line frequency, the so-called ripple signal, so that this signal is minimal. As a result of this, the detection signal from the phase comparator 73, which appears on the output 76 and which controls the voltage-controlled oscillator 77, no longer comprises a ripple component, which is important in order to avoid changes in hue in the reproduced picture color signal. This is because the ripple signal gives rise to annoying changes in hue in the reproduced picture color signal.

The IC 18 has a further control input 87 connected to a further control output 89 of the control device 17 via a control connection 88. The control device 17 can supply a control signal to the phase switching stage 74 via the control connection 88, by means of which control signal, the phase switching stage 74 can be disabled in order to minimize the ripple signal. The control device 17 is then constructed in such a manner that it disables the phase switching stage 74 in each reproduction mode when character signals are inserted into a reproduced picture signal.

When the phase switching stage 74 has been disabled, the phase comparator stage 73, whose output 76 is connected to a further output 90 of the IC 18, will supply a distinct rectangular detection signal of half the line frequency, i.e. a ripple signal. In the present case this detection signal directly constitutes a control signal S2, which is in fact identical to the control signal S1 appearing on the output 54 of the IC 18 in the recording mode. The control signal S2 appearing on the output 90 of the IC 18 is applied to the control input 36b of the modulator 36 via a connection 91 to be described below. The connection 91 includes a loop filter 92 after the output 90 of the IC 18. After the loop filter 92, the connection 91 includes a second switching device 93 which can be controlled by the control device 17 in the same way as the first switching device 82. To control this second switching device 93, this device is connected to the control output 83 of the control device 17 via a control connection 93a in the same way as the first switching device 82. The control device 17 controls the second switching device 93 via the control connection 93a in such a manner that in the second further reproduction mode of the video recorder 1, the control device 17 sets the second switching device 93 to a first switch position, shown in a solid line in FIG. 1, in which position a second delay device 94 of the video recorder 1, which device has a delay of one line period, is arranged in series with the second switching device 93, and the control signal S2 appearing on the output 76 of the phase comparator 73 is transferred with a delay of one line period to the output 95 of the second switching device 93 and from there to the modulator 36. In all the other reproduction modes of the video recorder 1, the control device 17 sets the second switching device 93 to a second switch position, shown in a broken line in FIG. 1, via the control connection 93a, in which position the second delay device 94 is bypassed and the control signal S2 appearing on the output 76 of the phase comparator 73 is transferred without a delay to the output 95 of the second switching device 93 and from there to the modulator 36. Since the control signal S2 to be delayed, which is of half the line frequency, is rectangular the second delay device 94 can be constructed very simply as an inverter circuit. However, it may also be formed by a so-called 1H delay line.

From the output 95 of the second switching device 93, a control signal S2 supplied by this device is applied to a transistor stage 96 forming a switching and buffer stage whose transistor is connected to a constantly available supply voltage +V and whose base voltage divider can be connected to a supply voltage +V2. However, the supply voltage +V2 is applied to the base voltage divider of the transistor stage 96 only if the video recorder 1 has been set to a reproduction mode. From the transistor stage 96, whose emitter resistor is formed by the emitter resistor of the transistor stage 56, the control signal S2 is applied to the amplifier stage 57 and from this stage to the control input 36b of the modulator 36.

In the modulator 36, the control signal S2, appearing on the output 90 of the IC 18 in each reproduction mode, is processed in the same way as the control signal S1 appearing on the output 54 of the IC 18 in a recording mode, so that in all the reproduction modes the character color signal is also phase-locked to the picture color signal. In all the reproduction situations, the 4.43 MHz output signal of the oscillator stage 52 appearing on the output 51 of the IC 18 is also applied to the input 36a of the modulator 36 for modulation purposes.

By arranging the second switching device 93 in the connection 91, it is achieved that in the second further reproduction mode of the video recorder 1, the second delay device 94 delays the control signal S2 appearing on the output 90 of the IC 18 by the same time as the picture color signal delayed by the first delay device in such a second further reproduction mode. As a result of these equal delays of the picture color signal and the control signal S2 during a so-called multi-speed reproduction of a long-play recording, it is achieved that also in this mode of operation, as in all the other reproduction modes and recording modes, the phase of the (R−Y) component of a character color signal, which phase is determined by this control signal S2 in the modulator 36, corresponds to the phase of the (R−Y) component of the picture color signal. Thus, the provision of the second switching device 93 and the second delay device 94 preceding it simply ensures that in the present video recorder 1 in all the possible modes of operation, i.e. also in a second further mode, the picture color signals always remain locked to the character color signals in the same way, so that character signals are always reproduced with the same color on a display screen of a television receiver. This ensures that an annoying change of color during character reproduction is avoided.

In the exemplary embodiment described above, the detection stage formed by a phase comparator for the detection of the phase of the burst signal in the reconverted picture color signal forms part of a phase-locked loop of the frequency conversion circuit in an IC. This has the advantage that the phase comparator has a double use. However, for the detection of the phase of the burst signal in the reconverted picture color signal, it is also possible to use a separate phase detection stage external to the IC. Moreover, such a separate phase detection stage may supply a detection signal of a non-rectangular shape and may, for example, supply a brief detection pulse indicating the direction of a phase change upon each phase change of the burst signal. The video recorder described above is an apparatus for recording and reproducing picture signals in accordance with the PAL system. However, the steps in accordance with the invention can be applied in an entirely similar manner to apparatus for recording and reproducing picture signals in accordance with the SECAM system. In the last-mentioned apparatuses, the detection stage is merely constructed as a frequency detection stage for detecting the center frequencies of the unmodulated color subcarrier signals in the reconverted picture color signal and by means of the detection signal of half the line frequency received from the frequency detection stage, which detection signal is preferably applied directly to the modulator for modulating the character signals, a rigid frequency interlock between the picture color signals and the character color signals is realized. In such apparatuses in accordance with the SECAM system, the frequency conversion stage may be formed by a frequency multiplier instead of by a mixer stage because in this system the picture color signals are frequency-modulated.

The embodiment described above concerns a video recorder in which a luminance signal and a color signal combined to form a CVBS signal are processed in common, for which reason the character signals are also inserted as CVBS signals, which are supplied in CVBS form by the modulator. However, the steps in accordance with the invention can also be used in apparatuses in which a luminance signal and a color signal are processed separately, as for example in SVHS apparatuses, in which case the modulator supplies separate character luminance signals to be inserted and separate character color signals to be inserted, which are then inserted separately into the picture luminance signals and into the picture color signals by means of two separate character insertion stages.

I claim:

1. A system for recording and reproducing picture signals comprising a phase-modulated picture color signal on and from a magnetic tape in adjacent tracks which are inclined relative to the longitudinal direction of the tape, said picture signals being recordable and reproducible in a first recording mode and in a first reproduction mode with a first tape speed, and in a second recording mode and in a second reproduction mode with a second tape speed, said second tape speed being a sub-multiple of the first tape speed, picture signals recorded in the first recording mode being additionally reproducible in at least one first further reproduction mode with at least one first further tape speed which differs from the first tape speed, and picture signals recorded in the second recording mode being additionally reproducible in at least one second further reproduction mode with at least one second further tape speed which differs from the second tape speed, the system comprising:

a conversion stage for reconverting a reproduced phase-modulated picture color signal (F) to an original frequency range, said conversion stage supplying the reconverted picture color signal to an output;

a detection stage coupled to the output of the conversion stage, said detection stage comprising a phase detection stage for detecting a phase of a burst signal in the reconverted picture color signal, said detection stage supplying a detection signal of half a line frequency of said picture signal to an output;

a first delay device having an input coupled to the output of said conversion stage and an output, said first delay device having a delay time of one line period;

a first switching device having a first input coupled to the output of said first delay device, a second input coupled to the output of the conversion stage, a control input and an output;

a control device having an output coupled to the control input of said first switching means for controlling the first switching means, whereby said first switching device is set to a first switch position by the control device in the second further reproduction mode of the system, wherein the first input of said first switching device is connected to the output of the first delay device of the system and the reconverted picture color signal at the output of the conversion stage is transferred with a delay of one line period to the output of the first switching device, and whereby said first switching device is set to a second switch position by the control device in all the other reproduction modes of the system, wherein the second input of said first switching device is connected to the output of said first switching device, the first delay device being bypassed and the reconverted picture color signal at the output of the conversion stage is transferred without a delay to the output of the first switching device;

a further signal-processing stage having an input coupled to the output of the first switching device, and an output;

a character generator for generating character signals;

a modulator having an input coupled to an output of the character generator, an output, and a control input, said modulator modulating the character signals into modulated character signals; and a character insertion stage coupled to the output of the further signal processing stage and to the output of the modulator, said character insertion stage selectively inserting the modulated character signals at least into the reproduced picture signals, wherein a control signal (S2) of half the line frequency is applied to the control input of the modulator, said control signal being phase-locked to said detection signal of half the line frequency at the output of the detection stage, whereby the reproduced picture color signals and the modulated character color signals to be inserted are locked in phase, characterized in that the system further comprises:

a second delay device having a delay time of one line period, said second delay device having an input for receiving said modulator control signal (S2), and an output; and a second switching device having an output coupled to the control input of the modulator, a first input coupled to the output of said second delay device, a second input for receiving said modulator control signal (S2), and a control input coupled to the same output of the control device as the control input of the first switching device, whereby said second switching device is set to a first switch position by the control device in the second further reproduction mode of the system, wherein the first input of the second switching device is connected to the output of the second switching device, and the control signal (S2) is applied to the control input of the modulator with a delay of one line period, and whereby said second switching device is set to a second switch position by the control device in all the other reproduction modes of the system, wherein the second input of the second switching device is connected to the output of the second switching device, the second delay device being bypassed and the control signal is applied to the control input of the modulator without a delay.

2. A system as claimed in claim 1, characterized in that the detection stage is adapted to supply a rectangular detection signal of half the line frequency which also forms the control signal (S2) applied to the control input of the modulator, and the second delay device, which is arranged in series with the second switching device (93) in the first switch position of said second switching device, is constituted by an inverter circuit for inverting the rectangular control signal (S2) of half the line frequency.

3. A system as claimed in claim 2, characterized in that the phase detection stage detects the phase of the burst signal in the reconverted picture color signal in relation to the phase of a reference signal applied to an input of the phase detection stage, and said system further comprises a phase switching stage having an input for receiving the reference signal and an output coupled the input of the phase detection stage, and a control input coupled to an output of the control device, whereby the phase of the reference signal can be switched between two given phase angles by the control device, and during the insertion of character signals into the reproduced picture signal, the first switching device and the second switching device are controlled by the control device and, in addition the phase switching stage is disabled by the control device.

4. A system for recording and reproducing picture signals comprising a frequency-modulated picture color signal on and from a magnetic tape in adjacent tracks which are inclined relative to the longitudinal direction of the tape, said picture signals being recordable and reproducible in a first recording mode and in a first reproduction mode with a first tape speed, and in a second recording mode and in a second reproduction mode with a second tape speed, said second tape speed being a sub-multiple of the first tape speed, picture signals recorded in the first recording mode being additionally reproducible in at least one first further reproduction mode with at least one first further tape speed which differs from the first tape speed, and picture signals recorded in the second recording mode being additionally reproducible in at least one second further reproduction mode with at least one second further tape speed which differs from the second tape speed, the system comprising:

a conversion stage for reconverting a reproduced frequency-modulated picture color signal (F) to an original frequency range, said conversion stage supplying the reconverted picture color signal to an output;

a detection stage coupled to the output of the conversion stage, said detection stage comprising a frequency detection stage for detecting a frequency of a non-modulated color subcarrier signal in the reconverted picture color signal, said detection stage supplying a detection signal of half a line frequency of said picture signal to an output;

a first delay device having an input coupled to the output of said conversion stage and an output, said first delay device having a delay time of one line period;

a first switching device having a first input coupled to the output of said first delay device, a second input coupled to the output of the conversion stage, a control input and an output;

a control device having an output coupled to the control input of said first switching means for controlling the first switching means, whereby said first switching device is set to a first switch position by the control device in the second further reproduction mode of the system, wherein the first input of said first switching device is connected to the output of the first switching device and the reconverted picture color signal at the output of the conversion stage is transferred with a delay of one line period to the output of the first switching device, and whereby said first switching device is set to a second switch position by the control device in all the other reproduction modes of the system, wherein the second input of the first switching device is connected to the output of the first switching device, the first delay device being bypassed and the reconverted picture color signal at the output of the conversion stage is transferred without a delay to the output of the first switching device;

a further signal-processing stage having an input coupled to the output of the first switching device, and an output;

a character generator for generating character signals;

a modulator having an input coupled to an output of the character generator, an output, and a control input, said modulator modulating the character signals into modulated character signals; and a character insertion stage coupled to the output of the further signal processing stage and to the output of the modulator, said character insertion stage selectively inserting the modulated character signals at least into the reproduced picture signals, wherein a control signal (S2) of half the line frequency is applied to the control input of the modulator, said control signal being phase-locked to said detection signal of half the line frequency at the output of the detection stage, whereby the reproduced picture color signals and the modulated character color signals to be inserted are locked in frequency, characterized in that the system further comprises:

a second delay device having a delay time of one line period, said second delay device having an input for receiving said modulator control signal (S2), and an output; and a second switching device having an output coupled to the control input of the modulator, a first input coupled to the output of said second delay device, a second input for receiving said modulator control signal (S2), and a control input coupled to the same output of the control device as the control input of the first switching device, whereby said second switching device is set to a first switch position by the control device in the second further reproduction mode of the system, wherein the first input of the second switching device is connected to the output of the second switching device, and the control signal (S2) is applied to the control input of the modulator with a delay of one line period, and whereby said second switching device is set to a second switch position by the control device in all the other reproduction modes of the system, wherein the second input of the second switching device is connected to the output of the second switching device, the second delay device being bypassed and the control signal is applied to the control input of the modulator without a delay.

* * * * *